(12) United States Patent
Schulte (10) Patent No.: US 12,233,587 B2
(45) Date of Patent: Feb. 25, 2025

(54) COEXTRUSION DIE FOR MANUFACTURING MULTILAYER TUBULAR PREFORMS MADE FROM THERMOPLASTIC PLASTIC

(71) Applicant: BBM Maschinenbau und Vertriebs GmbH, Langenberg (DE)

(72) Inventor: Felix Schulte, Langenberg (DE)

(73) Assignee: BBM Maschinenbau Und Vertriebs GmbH, Langenberg (DE)

( * ) Notice: Subject to any disclaimer, the term of this patent is extended or adjusted under 35 U.S.C. 154(b) by 103 days.

(21) Appl. No.: 18/112,222

(22) Filed: Feb. 21, 2023

(65) Prior Publication Data

US 2023/0264406 A1 Aug. 24, 2023

(30) Foreign Application Priority Data

Feb. 21, 2022 (DE) ............ 10 2022 104 059.3

(51) Int. Cl.
*B29C 48/335* (2019.01)
*B29C 48/09* (2019.01)
*B29C 48/21* (2019.01)

(52) U.S. Cl.
CPC ......... *B29C 48/3366* (2019.02); *B29C 48/09* (2019.02); *B29C 48/21* (2019.02)

(58) Field of Classification Search
None
See application file for complete search history.

(56) References Cited

U.S. PATENT DOCUMENTS

| 4,838,778 | A | | 6/1989 | Becker et al. |
| 5,206,032 | A | * | 4/1993 | Bock ............... B29C 48/3366 425/523 |
| 7,883,329 | B2 | | 2/2011 | Richter |

FOREIGN PATENT DOCUMENTS

| DE | 2712910 A1 | 9/1978 |
| DE | 3700237 A1 | 7/1988 |
| DE | 3704698 A1 | 8/1988 |
| DE | 3706171 A1 | 9/1988 |
| EP | 1740362 B1 | 8/2007 |

* cited by examiner

*Primary Examiner* — Yung-Sheng M Tsui
(74) *Attorney, Agent, or Firm* — Muncy, Geissler, Olds & Lowe, P.C.

(57) ABSTRACT

A coextrusion die for manufacturing multilayer, coextruded, tubular preforms made from thermoplastic plastic. A storage cylinder element has an inner storage space. A spindle, and an annular storage space is formed between the spindle and the storage cylinder element, which opens into an output ring channel. An extrusion head, which is axially displaceable with respect to the storage cylinder element includes a ring piston, in which at least two heart distributor elements are coaxially arranged. A flow channel is formed in each case between the ring piston and the adjacent heart distributor element as well as between each of two heart distributor elements, which widens from an inlet opening to a distributor ring channel from where it transitions into a cylindrical ring channel as a frustoconical ring channel.

11 Claims, 6 Drawing Sheets

COEXTRUSION DIE FOR MANUFACTURING MULTILAYER TUBULAR PREFORMS MADE FROM THERMOPLASTIC PLASTIC

This nonprovisional application claims priority under 35 U.S.C. § 119(a) to German Patent Application No. 10 2022 104 059.3, which was filed in Germany on Feb. 21, 2022, and which is herein incorporated by reference.

BACKGROUND OF THE INVENTION

Field of the Invention

The invention relates to a coextrusion die for manufacturing multilayer tubular preforms made from thermoplastic plastic.

Description of the Background Art

The basic requirement of a coextrusion die for a multilayer preform is, on the one hand, that equal local flow rates must set in in each layer, viewed over the circumference, to keep the particular layer homogeneous within itself, and on the other hand, that the flow rates of all layers are synchronized among each other to thereby obtain a preform having constant wall thickness distributions in all layers. The problem lies in the variably long flow paths of partial streams of the plastic melt, which directly enter the annular gap close to the inlet opening, and those of other partial streams, which are to flow only up to the diametric end of the distributor ring channel to also sufficiently supply the rear-facing circumferential region. In order for all partial streams to leave the annular gap at the same time and result in a homogeneous, annular molten mass which has uniform flow rates over its entire circumference, the partial streams which have flowed directly into the ring channel over a short distance must be braked by increasing the local flow resistance, for which purpose only the gap width is conventionally available as an adjusting means.

A generic coextrusion die is known from EP 1 740 362 B1, which corresponds to US 2007/0202209. It provides a distributor ring channel, which extends in a diametric plane along the circumference of the frustoconical section. It is proposed to influence the local flow rates along the circumference in that, at the frustoconical section, a large gap with is given in the region of the inlet opening and a small gap with is given at a diametrically opposed point of the distributor ring channel, while the gap width distribution on the cylindrical section adjoining below the frustoconical section is the exact reverse. The disadvantage is that different pressure differences set in thereby at the same angle positions above at the frustoconical section and below at the cylindrical section. The internal equalization thereof causes melt not only to flow in parallel to the center line along the heart distributor element but also cross flow portions to set in, thus resulting in a flow at an angle to the center line. It is therefore difficult to achieve a homogeneous and constant wall thickness distribution over the circumference in every layer.

DE 37 00 237 A1, which corresponds to U.S. Pat. No. 4,838,778, shows a coextrusion die, in which the particular plane of the distributor ring channels is oriented in an inclined manner with respect to a center line. The cross-section decreases in the direction of the lowest point. The pressure distribution over the length of the distributor ring channels is improved thereby. However, the merging of the two partial streams remains problematic. They ideally merge at the lowest point. In practice, however, very small pressure deviations result in the fact that the seam is displaced and/or the flow fronts do not completely unite into a homogeneous film.

The problem described above in the merging flow fronts also results in a coextrusion die known in each case from DE 37 06 171 A1 or DE 37 04 698 A1, in which the improvement of the pressure ratios over the length of the flow path is to be achieved not only via an inclination but also via a curvature of the distributor ring channel.

According to DE 27 12 910 A1, it is proposed to provide a distributor ring channel having a constant cross-section in a coextrusion die. The improvement of the flow behavior is to be achieved in that the melt is not conducted directly out of the distributor ring channel in the discharge direction of the molten tube, but rather that a 90° upward deflection into a diameter-reduced flow channel is first carried out, which is followed by a 180° deflection. However, high pressure losses are associated with the multiple deflections.

SUMMARY OF THE INVENTION

It is therefore an object of the invention to improve a coextrusion die in such a way that a homogeneous and constant wall thickness distribution may be achieved over the circumference in every layer.

The invention results in an optimized flow behavior of the plastic melt along the entire circumference of the ring channel and in a uniform flow rate distribution in the end region of the cylindrical section at the latest, in particular, however, as early as the transition from the frustoconical section to the cylindrical section.

According to an exemplary embodiment of the invention, this is achieved, in particular, in that the distributor ring channel is inclined downwardly from the inlet opening, the inclined distributor ring channel extending over the frustoconical section. This results in a shortening of the flow path for the individual imaginary partial streams within the flowing plastic melt, also referred to as stream filaments, which must cover the longest distance, namely from the inlet opening to the lower vertex.

The inclination of the distributor ring channel results in the fact that individual portions of the flow entering the ring gap in the region of the inlet opening must flow off vertically along the entire frustoconical section, while the portions flowing at a distance from the rear-facing circumferential region have already been deflected during the flow through the distributor ring channel up to the lower end of the frustoconical section or to the vicinity of the end region. If an inclined distributor ring channel were to be formed on a cylindrical section, the idea of virtually establishing a shortened path by an inclination of the flow channel would be in opposition to the circumstance of elongating this section, since the oblique plane of the distributor ring channel would be elliptical and the circumference would therefore be lengthened.

However, since the invention provides for forming the distributor ring channel in an inclined manner on the frustoconical section, viewed from the side, instead of vertically to the longitudinal axis, the elliptical diameter shrinks. The larger the cone angle and the greater the inclination of the distributor ring channel with respect to the diametric plane orthogonal to the center line, the more can an extension of the flow path down to the lower vertex be avoided. Depending on the cone angle and diameter, a shortening may even be achieved. Portions of the melt thus directly reach a lower end region of the frustoconical section on a flow path, which is shorter than in the case of a semicircle of a conventional distributor ring channel in the diametric plane.

The difference in the distances covered by the partial streams in each of the front and rear sections of the distributor ring channel is now significantly reduced.

Via a gap width adjustment, the partial streams in the region of the inlet opening, which have only a short flow path, are then additionally braked by a narrow gap width, which the gap width is the largest in the region of the lower vertex, so that the partial streams there are able to flow off largely unhindered. The gap width adjustment is carried out in relation to the viscosity of the plastic melt to be processed.

It is also important that the inclination of the distributor ring channel at a lower vertex already results in an annular channel being present only in the geometric sense but not in the fluidic sense. Instead, the flow is determined by a left and a right branch of the distributor ring channel.

In the coextrusion die according to the invention, equal flow rates are ultimately achieved over the circumference at the end of the cylindrical section, due to the different measures described.

The flow channel cross-section of the distributor ring channel preferably tapers in the direction of the lower vertex. This compensates for the increasingly reduced volume flow in the distributor ring channel due to the melt passing over into the ring channel, and the remaining portion is accelerated.

This optimized flow behavior is achieved by heart distributors which are adapted in diameter but have principally the same structure in all three flow channels of the coextrusion die, so that a multilayer, tubular preform having a homogeneous wall thickness distribution may be manufactured.

A further advantage provides for not having the distribution ring channel run in a plane, but rather to provide the distribution ring channel with different radii of curvature over the course of its two side branches, which lead to the lower vertex. Greater curvatures at the included distribution ring channel cause the vertical speed components to increase. As a result, greater curvatures are preferably provided in the region of the vertexes to improve the merging of the flow fronts in this location.

A further example provides for forming the distribution ring channel with a U-shaped cross-section profile having two straight, parallel edges. As a result, a larger flow cross-section having a reduced flow resistance is available in the distributor ring channel.

It is particularly advantageous to orient the profile cross-section of the distributor ring channel in the region of the lower vertex in such a way that the center line of the profile cross-section is oriented perpendicularly to the lateral surface of the frustoconical section. This means that the deflection angle for the plastic melt which passes over from the distribution ring channel into the frustoconical ring channel is no greater than 90°, while a deflection by an angle of 90°, plus the cone angle, would take place without this measure. The flow resistance is also reduced thereby in the regions where a locally higher flow resistance is needed to catch up to the partial streams which have flowed into the ring channel only over a short distance. The input of shearing energy into the melt at the outlet edges of the distribution ring channel is also reduced thereby.

Bends can also be provided in the distributor ring channel at the two vertexes.

An upward facing bend at the upper vertex acts as a stream splitter, to direct equal-sized volume flows of the melt into the right and left branches of the distributor ring channel.

A bend at the lower vertex can be used to deflect the melt from the distributor ring channel only into the frustoconical ring channel and to prevent portions thereof from flowing into the other branch of the distributor ring channel against the provided flow direction. The fluidic division of the distributor ring channel into two branches, which was already described above, is further strengthened thereby.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
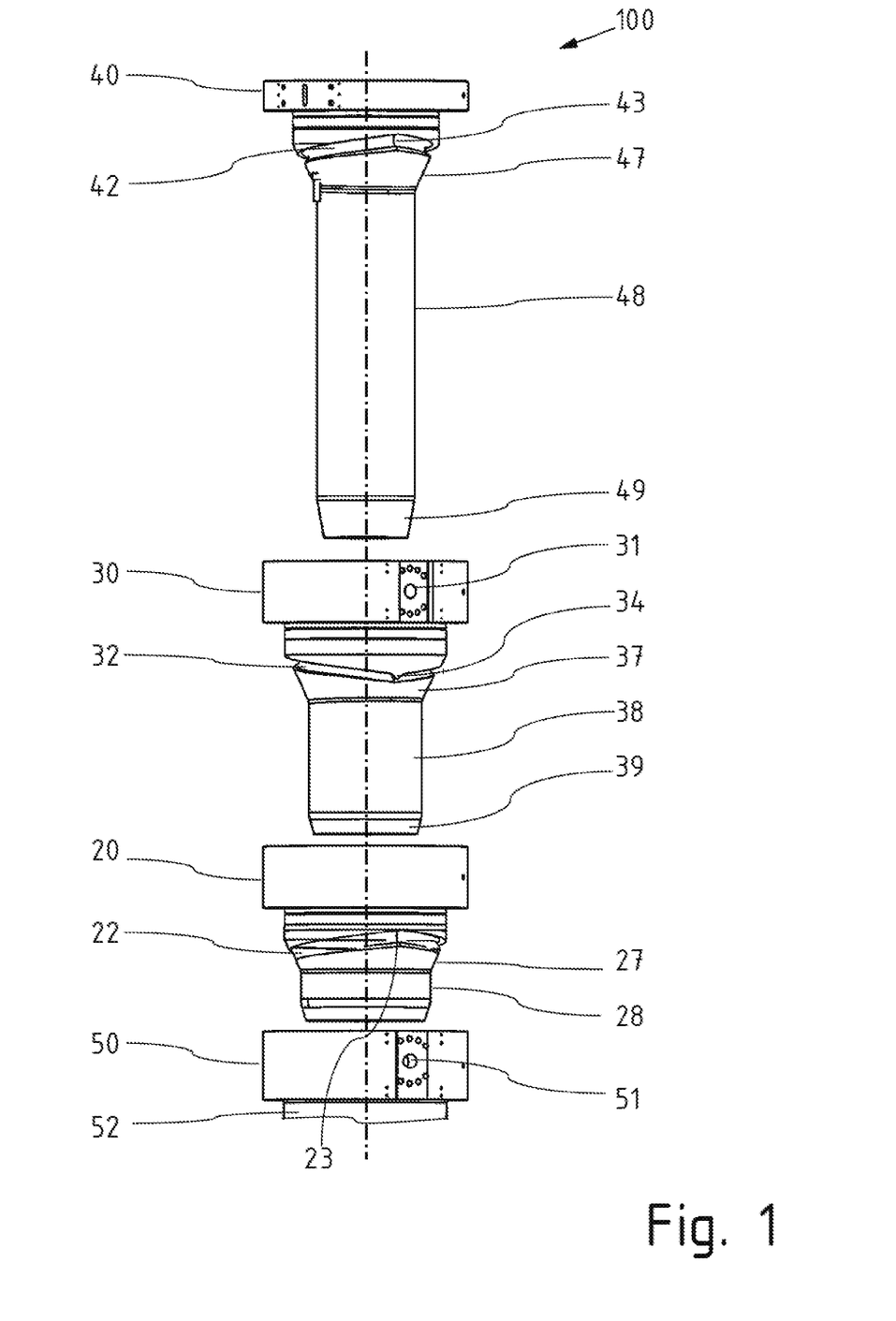
FIG. 1 is an exploded representation of parts of a coextrusion die.

FIG. 1 shows an exploded representation of parts of a coextrusion die 100, which is designed for manufacturing three-layer tubular preforms from thermoplastic plastic.

A ring piston 50 comprises a piston section 52, with the aid of which it is displaceably supported in a storage cylinder jacket element arranged in a stationary manner. Three heart distributor elements 20, 30, 40 having stepped diameters are to be inserted therein. First heart distributor element 20 is insertable into ring piston 50. It is itself also provided with an annular design, so that second heart distributor element 30 may be inserted therein. Heart distributor element 30 is also annular in cross-section, so that third heart distributor element 40, in turn, may be inserted therein.

Each of heart distributor elements 20, 30, 40 has a frustoconical section 27, 37, 47, along whose particular circumference extends a distributor ring channel 22, 32, 42. Heart distributor elements 20, 30, 40 continue below frustoconical section 27, 37, 47 in a cylindrical section 28, 38, 48 in each case. At the lower end, cylindrical sections 28, 38, 48 each terminate with a further frustoconical section 27, 37, 47.

Each of distributor ring channels 22, 32, 42 on heart distributor elements 20, 30, 40 extends from an upper vertex, to which the plastic melt flows, to a lower vertex on the rear side. In FIG. 1, upper vertexes 23, 43 of outer and inner heart distributor element 20, 40 are visible, while the lower vertex on the rear side is concealed. In middle heart distributor element 30, lower vertex 34 is visible, while the upper vertex is concealed.

Ring piston 50 has an upper housing section with a radial inlet opening 51, which, in the mounted state of coextrusion die 100, is positioned in alignment with upper vertex 23 of flow channel 22 in outer heart distributor element 20, so that flow channel 22 is supplied via inlet opening 51.

Outer heart distributor element 20 also has a peripheral inlet opening, which is not visible here and which extends radially to the inside for the purpose of supplying distributor ring channel 32 on middle heart distributor element 30.

An inlet opening 31 is provided on middle heart distributor element 30 for supplying distributor ring channel 42 on inner heart distributor element 40.

In this generally known design of a multilayer coextrusion die 100, it is essential to the invention that distributor channels 22, 32, 42 do not each run in a diametric plane but descend from the upper to the lower vertex. Each annular distributor ring channel has two points of discontinuity and is otherwise continuously curved. The points of discontinuity are situated on particular upper and lower vertexes 23, 34, 43, where each distributor ring channel 22, 32, 42 has a bend.

Figure 6:
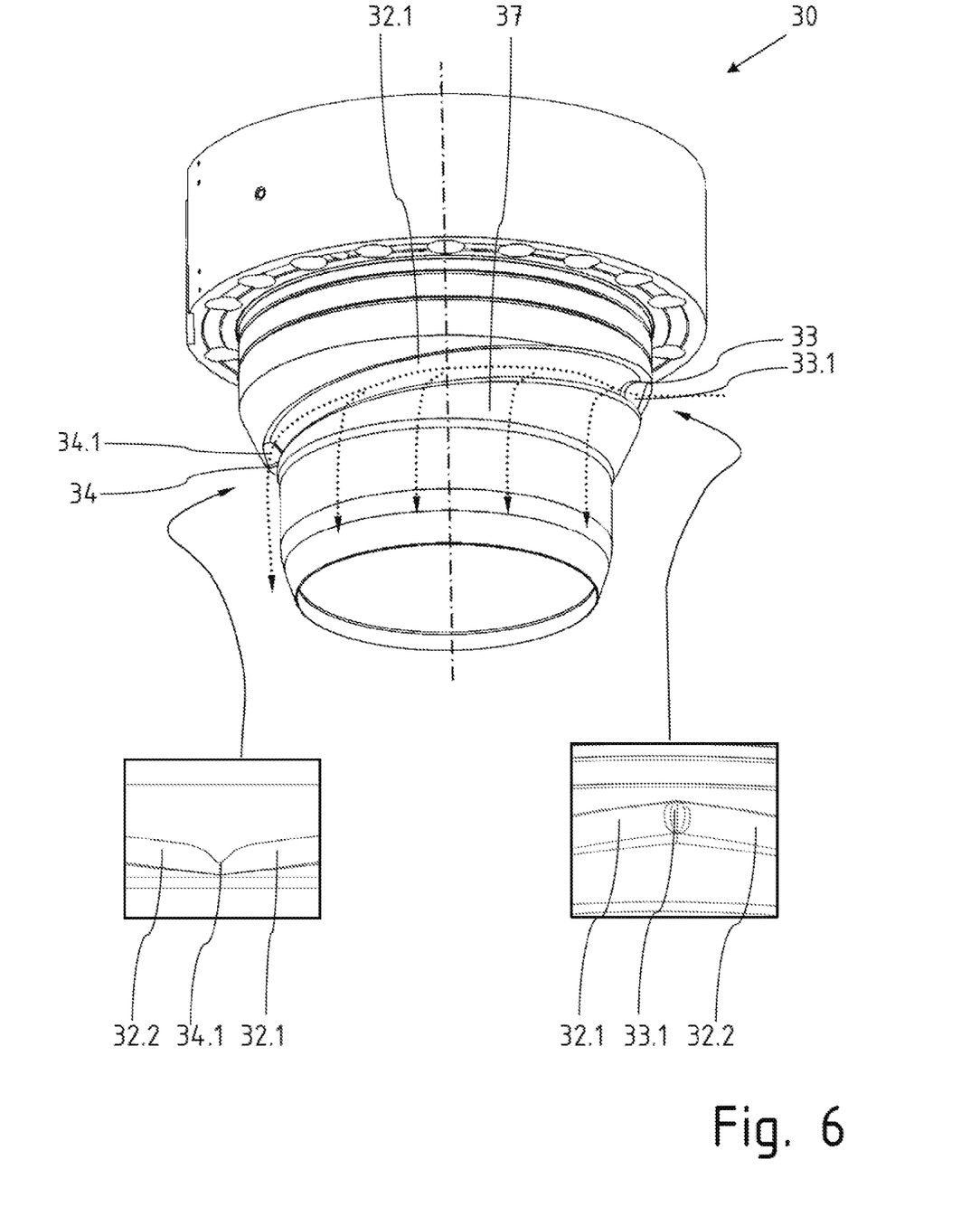
FIG. 6 is a perspective view of a heart distributor element in two detailed representations.

Based on the perspective view of middle heart distributor element 30 in FIG. 6, the special design of the distributor ring channels according to the invention are explained in greater detail.

The designation "distributor ring channel" is to be viewed in the geometric sense, since a true ring is not formed, but instead two arc-shaped flow channels are provided, which begin at the same inlet opening at upper vertex 33 and which are connected at least to a very small remaining cross-section on the diametrically opposed end at lower vertex 34. In terms of flow, the flow channels are each divided into an arc-shaped flow channel 32.1, which extends from upper vertex 33 in the counter-clockwise direction, and an arc-shaped flow channel 32.2, which extends from upper vertex 33 in the clockwise direction.

A wedge-shaped flow splitter element 33.1 is formed near the inlet opening at upper vertex 33, which extends radially to the outside and blocks the channel cross-section of distributor ring channel 32 to a large extent. The splitting of the inflowing plastic melt into two strands is achieved thereby. A strand is indicated by the dotted line.

A tab-like deflecting element 34.1 is formed at lower vertex 34, which descends from above into the cross-section of flow channels 32.1, 32.2. This achieves the fact that the two strands are deflected out of flow channels 32.1, 32.2 onto frustoconical section 37. Below deflecting element 34.1, the remaining cross-section of distributor ring channel 32 is reduced to at least 50% of the cross-section which exists on both sides in the vicinity of lower vertex 34 outside deflecting element 34.1. Due to the small remaining cross-section, a pressure compensation remains possible between the two flow channels 32.1, 32.2, and the merging of the two strands is made possible, the main flow direction, however, being directed downward along frustoconical element 37.

Figure 2:
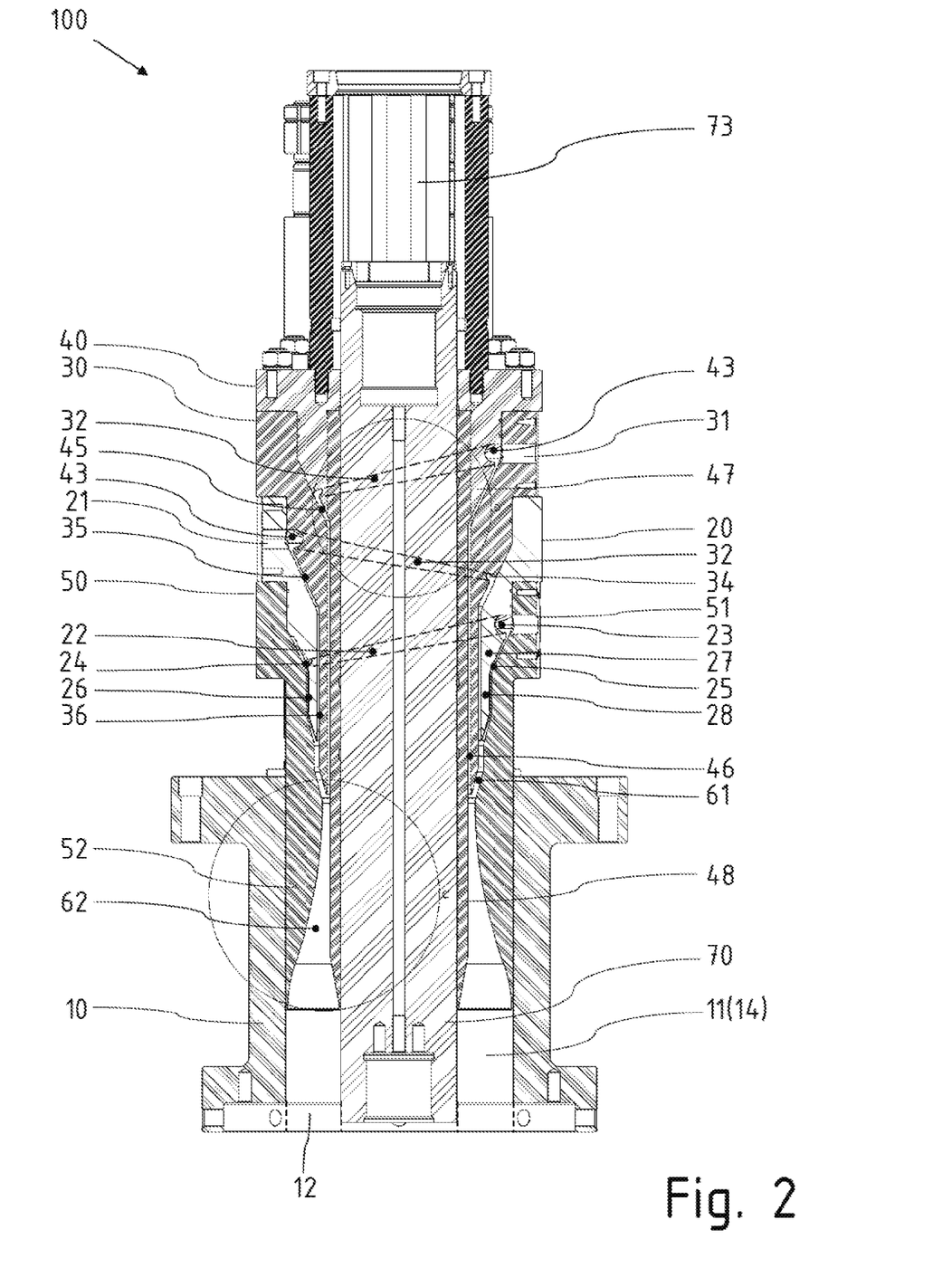
FIG. 2 is a sectional view of the mounted coextrusion die.

A sectional view of mounted coextrusion die 100 is illustrated in FIG. 2. Storage cylinder element 10, which is the immobile part of the die, is situated on the outside. It has a large storage space 11, in which piston section 52 of ring piston 50 is displaceably guided. Due to the fact that a spindle 70 projects therein, an annular storage space 14 forms between storage cylinder element 10 and spindle 70, which ends at the bottom in an output ring channel 12. The spindle is used to axially guide ring piston 50, together with heart distributor elements 20, 30, 40 inserted therein.

Heart distributor element 20 is inserted into ring piston 50, its inner wall in the upper region being formed in parallel to the outer wall of heart distributor element 20 in each case. The same applies to the inner contour of heart distributor element 20 and heart distributor element 30 inserted therein as well as, in turn, to its inner contour and heart distributor element 40 inserted therein.

A frustoconical ring channel 25, 35, 45 is formed thereby between one of frustoconical sections 27, 37, 47 and the particular inner wall of the adjacent element. A cylindrical ring channel section 26, 36, 46 then adjoins each of cylindrical sections 28, 38, 48.

The flow channels in coextrusion die 100 are explained below:

Plastic melt for one layer of a preform is supplied to inlet openings 21, 31, 51. From there, it flows to particular upper vertex 23, 33, 43 of associated distributor ring channel 22, 32, 42. Since distributor channels 22, 32, 42 each have a bend in this location, so that an upwardly protruding web is formed, the plastic melt is split into two strands, each of which flows in the corresponding section of distributor ring channel 22, 32, 42 in a clockwise and a counter-clockwise direction. The strands unite again at lower vertex 24.

However, distributor ring channel 22, 32, 42 is not situated right next to the inner wall of the adjacent component and is therefore not hermetically sealed, so that a portion of the plastic melt passes over into frustoconical section 27, 37, 47 over the course of distributor ring channel 22, 32, 42, and the remaining portion continues to flow in distributor ring channel 22, 32, 42. The volume flow decreasing in the direction of lower vertex 24, 34, 44 is compensated for by a cross-section of distributor ring channel 22, 32, 42, which tapers in the direction of lower vertex 24, 34, 44. Each plastic melt flowing in a tubular manner then passes over from frustoconical ring channel 25, 35, 45 into associated ring channel section 26, 36, 46.

The two outer ring channel sections 26, 36 are the first to unite into a common flow channel 61. The latter combines with ring channel section 46 of the inner layer to form a common flow channel 62, in which all three layers are situated one on top of the other. The cross-section of common flow channel 62 widens and merges with annular storage space 14, from where the three-layer, tubular strand is discharged via output ring channel 12, in that ring piston 50 is moved axially.

Figure 3:
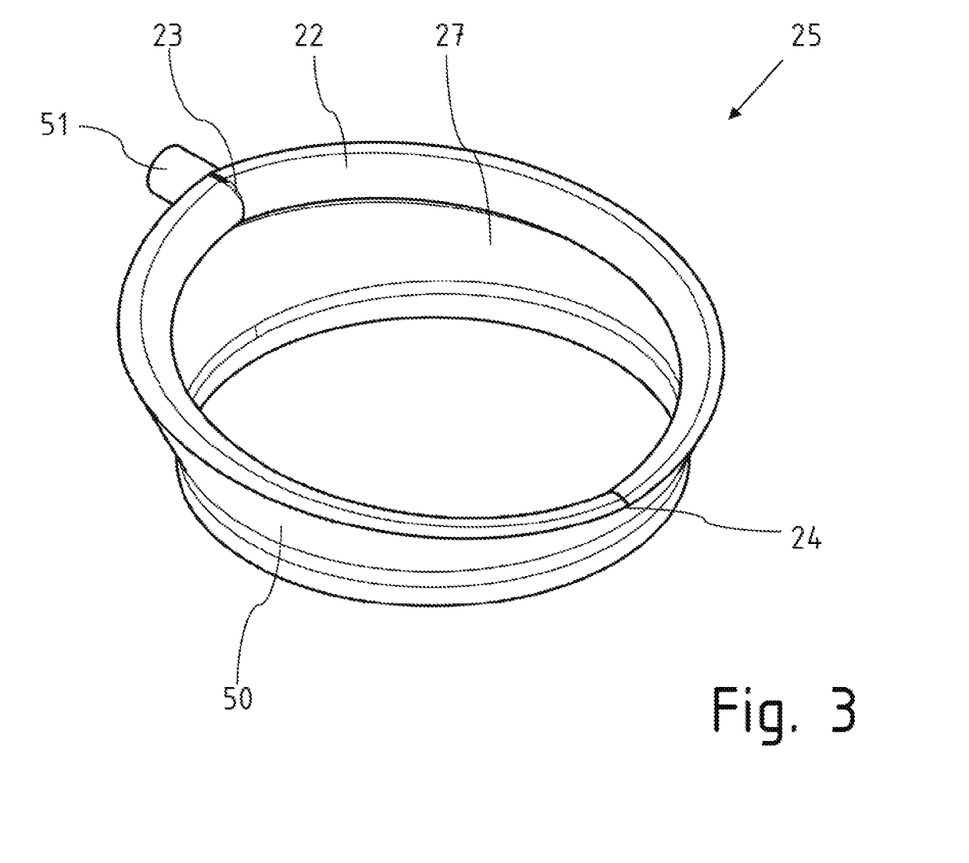
FIG. 3 is a perspective illustration of the space through which a melt flows at a heart distributer element.

FIG. 3 is a perspective illustration of the space through which melt flows in the form of frustoconical ring channel 25, including cylindrical ring channel section 26. The illustrated shape corresponds to a portion of plastic melt which has frozen between one of the heart distributor elements and the adjacent component.

This through-flow space is limited on its inner circumference by the walls of heart distributor element 20 in the region of distributor ring channel 22 and frustoconical section 27. The space is limited toward the outside by the inner wall of ring piston element 50. The inflow into the through-flow space takes place via inlet opening 51. The inclination of flow channel 22 between vertexes 23, 24 and the bends thereat are already clearly apparent in FIG. 3.

Figure 4:
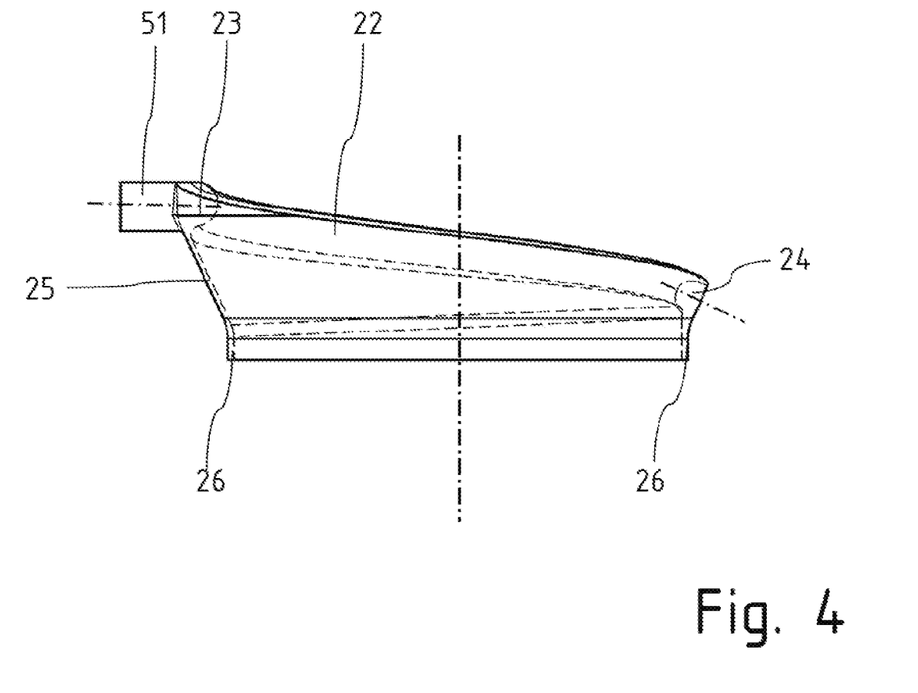
FIG. 4 is the through-flow space according to FIG. 3 in a side view.

FIG. 4 shows the through-flow space for the first outer layer of plastic melt at heart distributor element 20 in a side view with concealed lines. The below details should be emphasized here:

The side sections of distributor ring channel 22 do not run in a straight line between upper and lower vertexes 23, 24 but rather have a constant curvature without steps or further bends.

The curvature can be greater near the vertexes and less pronounced therebetween.

Distributor ring channel 22 has a U-profile in cross-section, i.e., it is made up in cross-section of a central semicircular profile section and two straight edges.

The profile cross-section of distributor ring channel 22 is oriented according to the cone angle in frustoconical ring channel 25, i.e., the center line of the profile cross-section is approximately perpendicular to the cone surface.

The width of the through-flow space, i.e., the gap width, is the smallest on the circumference at upper vertex 23 and the largest at lower vertex 24.

Figure 5:
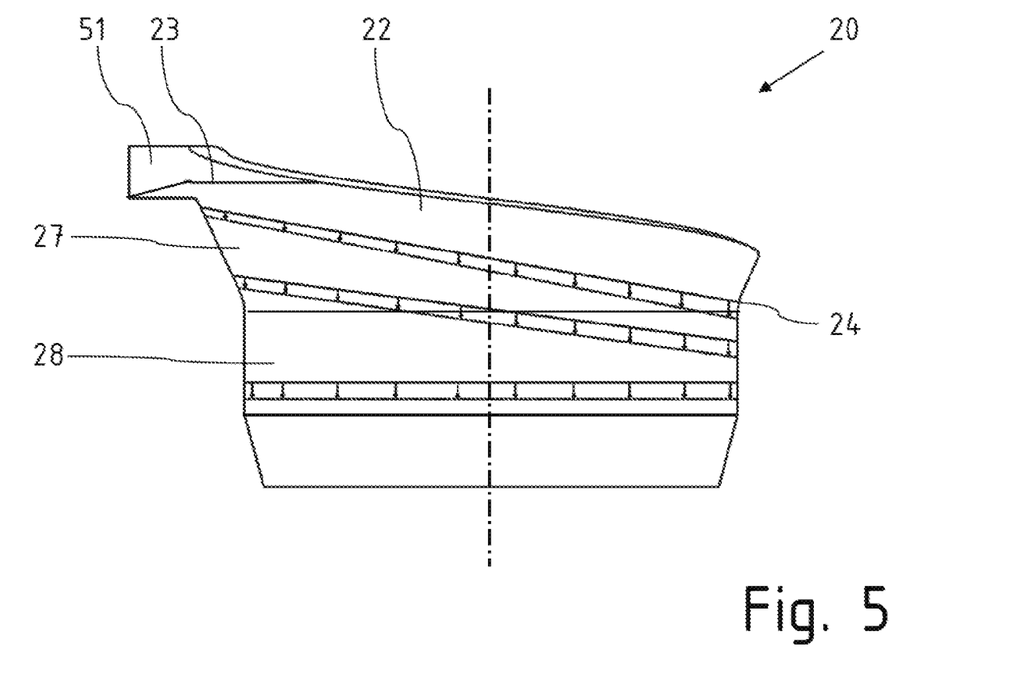
FIG. 5 is the flow rate distribution at a heart distributor element in a schematic side view.

The effects of the measures provided according to the preferred specific embodiment of the invention are: inclination of the distributor ring channel with respect to a diametric plane; profile cross-sectional shape of the distributor ring channel; cross-sectional inclination of the distributor ring channel perpendicular to the cone surface; and/or different gap with distributions on the circumference are illustrated in FIG. 5. This is a side view of heart distributor element 20. The three bands situated one over the other with the arrows mark the speed profile of the plastic melt at the particular location.

It should be considered that partial streams which flow directly from inlet opening 51 into frustoconical ring channel 27 cover a short distance, while partial stream which flow along from one of the two distributor ring channel sections to the lower vertex cover the longest distance. The inclination of the distributor ring channel according to the invention has the advantage that the flow path in the rear-facing region is much shorter in the direction of the lower vertex compared to a conventional design of a distributor ring channel. The gap width variation is therefore one way, but not the only way, of adapting the flow rates which are different locally on the circumference.

As illustrated in FIG. 5 based on the lower band, the local flow rates in the end region of cylindrical section 28 are equal over the circumference.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A coextrusion die for manufacturing a multilayer, coextruded, tubular preform made from thermoplastic plastic, the coextrusion die comprising:
   at least one storage cylinder element having an inner storage space;
   at least one spindle;
   an annular storage space being formed between the spindle and the storage cylinder element, which opens into an output ring channel; and
   at least one extrusion head that is axially displaceable with respect to the storage cylinder element and includes a ring piston, in which at least two heart distributor elements are coaxially arrangement; and
   a flow channel being formed between the ring piston and the adjacent heart distributor element as well as between each of two heart distributor elements, which widens from an inlet opening to a ring channel from where it transitions into a cylindrical ring channel as a frustoconical ring channel,
   wherein the distributor ring channel has an upper vertex arranged at the inlet opening from which one branch of the distributor ring channel extends on each side of the heart distributor element, and
   wherein the distributor ring channel descends with respect to a diametric plane in a direction of a lower vertex, which is situated in the frustoconical ring channel and at which the two branches of the distributor ring channel join together.

2. The coextrusion die according to claim 1, wherein the distributor ring channel descends in the direction of the lower vertex in a non-linear manner with a continuous curvature.

3. The coextrusion die according to claim 1, wherein the distributor ring channel has a lower bend at the lower vertex.

4. The coextrusion die according to claim 1, wherein the distributor ring channel has a upper bend at the upper vertex.

5. The coextrusion die according to claim 1, wherein the cross-section of the distributor ring channel decreases in size over its course from the upper vertex to the lower vertex.

6. The coextrusion die according to claim 1, wherein the lower vertex is arranged at the transition between the frustoconical ring channel and the cylindrical ring channel.

7. The coextrusion die according to claim 6, wherein a height offset between the upper vertex and the lower vertex in relation to the diameter of the cylindrical ring channel at the transition is selected such that a plane of intersection between the frustoconical ring channel and the cylindrical ring channel is not oriented in parallel to an orthogonal diametric plane.

8. The coextrusion die according to claim 1, wherein at least one distributor ring channel is formed in the heart distributor element as a groove having a U profile in cross-section, which has a low-lying, arc-shaped curvature and two straight edges, which discharge to the outside of the heart distributor element.

9. The coextrusion die according to claim 1, wherein a center line of the cross-sectional profile of the distributor ring channel in the region of the lower vertex is oriented substantially perpendicularly to the wall in the frustoconical section of the heart distributor element.

10. The coextrusion die according to claim 1, wherein a wedge-shaped flow splitter element is formed at the upper vertex at the inlet opening, which extends radially to the outside, where it blocks the channel cross-section of the distributor ring channel, via which the distributor ring channel is divided into an arc-shaped flow channel, which extends from the upper vertex in a clockwise direction, and into an arc-shaped flow channel, which extends from the upper vertex in the counter-clockwise direction.

11. The coextrusion die according to claim 10, wherein a tab-like deflecting element is formed at the lower vertex, which descends from above into the cross-section of the flow channels.

* * * * *